US008119976B2

(12) United States Patent
Squier et al.

(10) Patent No.: US 8,119,976 B2
(45) Date of Patent: Feb. 21, 2012

(54) OPTICAL-BASED CELL DEFORMABILITY

(75) Inventors: Jeff Squier, Golden, CO (US); David W. M. Marr, Golden, CO (US); Robert Applegate, Golden, CO (US); Tor Vestad, Golden, CO (US); Justin Chichester, Centennial, CO (US)

(73) Assignee: Colorado School of Mines, Golden, CO (US)

( * ) Notice: Subject to any disclaimer, the term of this patent is extended or adjusted under 35 U.S.C. 154(b) by 602 days.

(21) Appl. No.: 12/167,136

(22) Filed: Jul. 2, 2008

(65) Prior Publication Data

US 2009/0026387 A1 Jan. 29, 2009

Related U.S. Application Data

(60) Provisional application No. 60/947,899, filed on Jul. 3, 2007.

(51) Int. Cl.
*H01S 1/00* (2006.01)

(52) U.S. Cl. .................................... 250/251; 435/173.9

(58) Field of Classification Search .................. 250/251; 435/173.9
See application file for complete search history.

(56) References Cited

U.S. PATENT DOCUMENTS

| | | | |
|---|---|---|---|
| 4,190,535 | A | 2/1980 | Luderer |
| 5,148,511 | A | 9/1992 | Savu et al. |
| 5,304,487 | A | 4/1994 | Wilding et al. |
| 5,427,663 | A | 6/1995 | Austin |
| 5,512,745 | A | 4/1996 | Finer et al. |
| 5,541,072 | A | 7/1996 | Wang et al. |
| 5,622,831 | A | 4/1997 | Liberti et al. |
| 5,639,669 | A | 6/1997 | Ledley |
| 5,707,799 | A | 1/1998 | Hansmann et al. |
| 5,715,946 | A | 2/1998 | Reichenbach |
| 5,750,339 | A | 5/1998 | Smith |
| 5,770,029 | A | 6/1998 | Nelson et al. |
| 5,837,115 | A | 11/1998 | Austin |
| 5,858,188 | A | 1/1999 | Soane et al. |
| 5,866,345 | A | 2/1999 | Wilding et al. |
| 5,928,880 | A | 7/1999 | Wilding et al. |
| 5,952,173 | A | 9/1999 | Hansmann et al. |
| 6,007,690 | A | 12/1999 | Nelson |

(Continued)

FOREIGN PATENT DOCUMENTS

| | | |
|---|---|---|
| DE | 19712309 | 5/1998 |

(Continued)

OTHER PUBLICATIONS

Author Unknown, "The Optical Stretcher", available at http://www.uni-leipzig.de/~pwm/kas/os/os.html, cite updated on Nov. 23, 2005, 2 pages.

(Continued)

*Primary Examiner* — Robert Kim
*Assistant Examiner* — Michael Maskell
(74) *Attorney, Agent, or Firm* — Sheridan Ross P.C.

(57) ABSTRACT

A system, method, and device for re-orienting and/or deforming cells and other objects is provided. The system, method, and device may include a high-throughput setup that facilitates the ability to orient, deform, analyze, measure, and/or tag objects at a substantially higher rate than was previously possible. A relatively large number of cells and other objects can be deformed, by optical forces for example, as the cells and other objects a flowed through the system.

22 Claims, 8 Drawing Sheets

U.S. PATENT DOCUMENTS

| | | | | |
|---|---|---|---|---|
| 6,054,034 | A | 4/2000 | Soane et al. | |
| 6,067,859 | A * | 5/2000 | Kas et al. | 73/800 |
| 6,074,827 | A | 6/2000 | Nelson | |
| 6,156,270 | A | 12/2000 | Buechler | |
| 6,197,523 | B1 | 3/2001 | Rimm et al. | |
| 6,221,671 | B1 | 4/2001 | Groner et al. | |
| 6,241,894 | B1 | 6/2001 | Briggs et al. | |
| 6,251,691 | B1 | 6/2001 | Seul | |
| 6,256,093 | B1 | 7/2001 | Ravid et al. | |
| 6,256,096 | B1 | 7/2001 | Johnson | |
| 6,265,229 | B1 | 7/2001 | Fodstad et al. | |
| 6,315,940 | B1 | 11/2001 | Nisch et al. | |
| 6,344,326 | B1 | 2/2002 | Nelson | |
| 6,361,958 | B1 | 3/2002 | Shieh | |
| 6,368,871 | B1 | 4/2002 | Christel et al. | |
| 6,387,290 | B1 | 5/2002 | Brody et al. | |
| 6,432,630 | B1 | 8/2002 | Blankenstein | |
| 6,454,938 | B2 | 9/2002 | Moon et al. | |
| 6,465,225 | B1 | 10/2002 | Fuhr et al. | |
| 6,540,895 | B1 | 4/2003 | Spence et al. | |
| 6,565,225 | B2 | 5/2003 | Mabuchi et al. | |
| 6,613,525 | B2 | 9/2003 | Nelson et al. | |
| 6,632,619 | B1 | 10/2003 | Harrison et al. | |
| 6,635,163 | B1 | 10/2003 | Han et al. | |
| 6,664,104 | B2 | 12/2003 | Pourahmadi et al. | |
| 6,685,841 | B2 | 2/2004 | Lopez et al. | |
| 6,744,038 | B2 | 6/2004 | Wang et al. | |
| 6,746,503 | B1 | 6/2004 | Benett et al. | |
| 6,762,059 | B2 | 7/2004 | Chan et al. | |
| 6,783,647 | B2 | 8/2004 | Culbertson et al. | |
| 6,784,420 | B2 | 8/2004 | Wang et al. | |
| 6,802,489 | B2 | 10/2004 | Marr et al. | |
| 6,815,664 | B2 | 11/2004 | Wang et al. | |
| 6,830,936 | B2 | 12/2004 | Anderson et al. | |
| 6,833,542 | B2 | 12/2004 | Wang et al. | |
| 6,878,271 | B2 | 4/2005 | Gilbert et al. | |
| 6,881,315 | B2 | 4/2005 | Iida et al. | |
| 6,893,881 | B1 | 5/2005 | Fodstad et al. | |
| 6,913,697 | B2 | 7/2005 | Lopez et al. | |
| 6,958,245 | B2 | 10/2005 | Seul et al. | |
| 7,068,874 | B2 | 6/2006 | Wang et al. | |
| 7,088,455 | B1 * | 8/2006 | Kirkpatrick et al. | 356/502 |
| 7,150,812 | B2 | 12/2006 | Huang et al. | |
| 7,155,082 | B2 | 12/2006 | Oakey et al. | |
| 7,202,045 | B2 | 4/2007 | Hanash et al. | |
| 7,205,157 | B2 | 4/2007 | Jurgensen et al. | |
| 7,214,348 | B2 | 5/2007 | Desmond et al. | |
| 7,241,988 | B2 | 7/2007 | Gruber et al. | |
| 7,276,170 | B2 | 10/2007 | Oakey et al. | |
| 7,312,085 | B2 | 12/2007 | Chou et al. | |
| 7,318,902 | B2 | 1/2008 | Oakey et al. | |
| 7,472,794 | B2 | 1/2009 | Oakey et al. | |
| 7,745,788 | B2 * | 6/2010 | Appleyard et al. | 250/338.1 |
| 2001/0036672 | A1 | 11/2001 | Anderson et al. | |
| 2002/0005354 | A1 | 1/2002 | Spence et al. | |
| 2002/0058332 | A1 | 5/2002 | Quake et al. | |
| 2002/0108859 | A1 | 8/2002 | Wang et al. | |
| 2002/0113204 | A1 | 8/2002 | Wang et al. | |
| 2002/0115163 | A1 | 8/2002 | Wang et al. | |
| 2002/0115164 | A1 | 8/2002 | Wang et al. | |
| 2002/0123078 | A1 | 9/2002 | Seul et al. | |
| 2002/0123112 | A1 | 9/2002 | Wang et al. | |
| 2002/0132315 | A1 | 9/2002 | Wang et al. | |
| 2002/0132316 | A1 * | 9/2002 | Wang et al. | 435/173.9 |
| 2002/0172987 | A1 | 11/2002 | Terstappen et al. | |
| 2003/0032204 | A1 | 2/2003 | Walt et al. | |
| 2003/0072682 | A1 | 4/2003 | Kikinis | |
| 2003/0109040 | A1 | 6/2003 | Kas et al. | |
| 2003/0124516 | A1 * | 7/2003 | Chung et al. | 435/5 |
| 2004/0121343 | A1 | 6/2004 | Buechler et al. | |
| 2005/0049793 | A1 | 3/2005 | Paterlini-Brechot | |
| 2005/0175478 | A1 | 8/2005 | Marr et al. | |
| 2005/0221333 | A1 | 10/2005 | Sundararajan et al. | |
| 2006/0060767 | A1 * | 3/2006 | Wang et al. | 250/251 |
| 2006/0171846 | A1 | 8/2006 | Marr | |
| 2007/0026533 | A1 * | 2/2007 | Sundararajan et al. | 436/174 |
| 2007/0086919 | A1 * | 4/2007 | Akcakir | 422/82.05 |
| 2007/0125941 | A1 * | 6/2007 | Lee et al. | 250/251 |
| 2008/0093306 | A1 | 4/2008 | Oakey et al. | |
| 2009/0188795 | A1 | 7/2009 | Oakey et al. | |

FOREIGN PATENT DOCUMENTS

| | | |
|---|---|---|
| EP | 1221342 | 7/2002 |
| EP | 1412729 | 1/2003 |
| EP | 1438398 | 5/2003 |
| EP | 1338894 | 8/2003 |
| EP | 1485713 | 9/2003 |
| EP | 1499706 | 10/2003 |
| EP | 1539350 | 1/2004 |
| EP | 1529211 | 2/2004 |
| EP | 1542802 | 3/2004 |
| EP | 1418003 | 5/2004 |
| EP | 1462800 | 9/2004 |
| EP | 919812 | 10/2004 |
| WO | WO 94/29707 | 12/1994 |
| WO | WO 98/10267 | 3/1998 |
| WO | WO 99/44064 | 9/1999 |
| WO | WO 00/00816 | 1/2000 |
| WO | WO 02/12896 | 2/2002 |
| WO | WO 02/28523 | 4/2002 |
| WO | WO 02/30562 | 4/2002 |
| WO | WO 02/44689 | 6/2002 |
| WO | WO 03/031938 | 4/2003 |
| WO | WO 03/066191 | 8/2003 |
| WO | WO 2004/029221 | 4/2004 |
| WO | WO 2004/037374 | 5/2004 |
| WO | WO 2004/056978 | 7/2004 |

OTHER PUBLICATIONS

Gu, et al., "A single beam near-field laser trap for optical stretching, folding and rotation of erythrocytes", Optics Express, Feb. 5, 2007, vol. 15, No. 3., pp. 1369-1375, Optical Society of America.

Applegate Jr., et al., "Microfluidic sorting system based on optical waveguide integration and diode laser bar trapping", Lab on a Chip, Jan. 20, 2006, vol. 6, pp. 422-426, The Royal Society of Chemistry.

Gast, et al., "The microscopy cell (MicCell), a versatile modular flowthrough system for cell biology, biomaterial research, and nanotechnology", Microfluid Nanofluid (2006), published on-line Jul. 27, 2005, vol. 2, pp. 21-36, Springer-Verlag.

Guck, et al., "Optical Deformability as an Inherent Cell Marker for Testing Malignant Transformation and Metastatic Competence", Biophysical Journal, May 2005, vol. 88, pp. 3689-3698, Biophysical Society.

Guck, et al., "The Optical Stretcher: A Novel Laser Tool to Micromanipulate Cells", Biophysical Journal, Aug. 2001, vol. 81, pp. 767-784, Biophysical Society.

Pamme, et al., "Counting and sizing of particles and particle agglomerates in a microfluidic device using laser light scattering: application to a particle-enhanced immunoassay", Lab on a Chip, May 30, 2003, vol. 3, pp. 187-192, The Royal Society of Chemistry.

Gast, et al., "The development of integrated microfluidic systems at GeSiM", Lab on a Chip, 2003, vol. 3, pp. 6N-10N, The Royal Society of Chemistry.

Lincoln, et al., "Deformability-Based Flow Cytometry", Wiley InterScience, May 17, 2004, Cytometry Part A 59A, pp. 203-209, Wiley-Liss, Inc.

Lang, et al., "Resource Letter: LBOT-1: Letter based optical tweezers", Am J Phys., Mar. 2003, vol. 71(3), pp. 201-215, National Institute of Health.

Kim, et al., "Stretching and immobilization of DNA for studies of protein —DNA interactions at the single-molecule level", Nano Review, Apr. 18, 2007, Nanoscale Res Letter vol. 2, pp. 185-201, Springer.

Lu, et al., "Viscoelastic properties of individual glial cells and neurons in the CNS", PNAS, Nov. 21, 2006, vol. 103, No. 47, pp. 17759-17764, The National Academy of Sciences of the USA.

Chan, et al., "DNA Mapping Using Microfluidic Stretching and Single-Molecule Detection of Flourescent Site-Specific Tags", Genome Research, 2004, vol. 14, pp. 1137-1146, Cold Spring Harbor Laboratory Press.

Wuite, et al. "An Integrated Laser Trap/Flow Control Video Microscope for the Study of Single Biomolecules", Biophysical Journal, Aug. 2000, vol. 29, pp. 1155-1167, Biophysical Society.
Desprat, et al., "Creep Function of a Single Living Cell", Biophysical Journal, Mar. 2005, vol. 88, pp. 2224-2233, Biophysical Society.
Singh, et al., "A Miniaturized Wide-Angle 2D Cytometer", Wiley InterScience, Feb. 23, 2006, Cytometry Part A 69A, pp. 307-315, International Society for Analytical Cytology.
Lim, et al., "Large deformation of living cells using laser traps", Acta Materialia, Apr. 19, 2004, vol. 52, Issue 7, pp. 1837-1845, Elsevier Science Ltd., (Only abstract and figures/tables provided, 6 pages).
Visscher, et al., "Single Beam Optical Trapping Integrated in a Confocal Microscope for Biological Applications", Cytometry , Apr. 10, 1991, vol. 12, pp. 485-491, Wiley-Liss, Inc.
Author Unknown, "MicCell: Frequently Asked Questions", available at www.gesim.de, 2007, 4 pages.
Applegate et al., "Optical trapping, manipulation, and sorting of cells and colloids in microfluidic systems with diode laser bars", Colorado School of Mines, 2002, pp. 1-9.
Archer et al. "Cell Reactions to Dielectrophoretic Manipulation." Biochemical and Biophysical Research Communications. 1999;257:687-98.
Ashcroft et al., "Solid State Physics." Orlando, FL: Saunders College Publishing; 1976.
Bauer, "Advances in cell separation: recent developments in counterflow centrifugal elutriation and continuous flow cell separation." Journal of Chromatography.1999;722:55-69.
Becker et al. "Fabrication of Microstructures With High Aspect Ratios and Great Structural heights by Synchrotron Radiation Lithography, Galvanoforming, and Plastic Moulding (LIGA Process)." Microelectronic Engineering. 1986;4:35-56.
Becker et al. "Planar quartz chips with submicron channels for two-dimensional capillary electrophoresis applications." J. Micromech Microeng.1998;9:24-28.
Beebe et al., "Functional Hydrogel Structures for Autonomous Flow Control Inside Microfluidic Channels", Nature, Apr. 6, 2000, pp. 588-590, 404, Nature Publishing Group (USA), a division of Macmillan Publishers Ltd., United Kingdom.
Benincasa et al. "Cell Sorting by One Gravity SPLITT Fractionation." Analytical Chemistry. 2005; 77(16):5294-5301.
Berg, "Random Walks in Biology." Princeton University Press. Princeton, NJ; 1993.
Brown et al. "Optical Waveguides Via Viscosity-Mismatched Microfluidic Flows." Department of Chemical Engineering, Colorado School of Mines. Applied Physics Letters 88, 134109 (2006).
Chiu et al., "Patterned Deposition of Cells and Proteins Onto Surfaces by Using Three-Dimensional Microfluidic Systems", Proceedings of the National Academy of Sciences of the United States of America, Mar. 14, 2000, pp. 2408-2413, 97-#6, National Academy of Sciences, USA.
Chou et al., "A Microfabricated Device for Sizing and Sorting DNA Molecules", Proceedings of the National Academy of Sciences of the United States of America, Jan. 5, 1999, pp. 11-13, 96-#1, National Academy of Sciences, USA.
Chou et al., "Sorting by diffusion: An asymmetric obstacle course for continuous molecular separation." PNAS. 1999; 96(24):13762-13765.
De Kretser et al., "The Separation of Cell Populations using Monoclonal Antibodies attached to Sepharose." Tissue Antigens. 1980;16:317-325.
Delamarche et al., "Microfluidic Networks for Chemical Patterning of Substrates: Design and Application to Bioassays", Journal of the American Chemical Society, Jan. 9, 1998, pp. 500-508, 120, American Chemical Society, USA.
Delamarche et al., "Patterned Delivery of Immunoglobulins to Surfaces Using Microfluidic Networks", Science, May 2, 1997, pp. 779-781, 276, American Association for the Advancement of Science, USA.
Deshmukh et al., "Continuous Micromixer With Pulsatile Micropumps. Solid-State Sensor and Actuator Workshop." Hilton Head Island, South Carolina; Jun. 4-8, 2000:73-76.
Duffy et al., "Rapid Prototyping of Microfluidic System in Poly(dimethylsiloxane)", Anal. Chem., 70 (23) 4974-4984, 1998 (abstract only, if the examiner desires the full article please contact the attorney of record and a copy will be provided).
Eigen et al., "Sorting Single Molecules: Application to Diagnostics and Evolutionary Biotechnology", Proceedings of the National Academy of Sciences of the United States of America, Jun. 1994, pp. 5740-5747, 91, National Academy of Sciences, USA.
Evans et al., "The Bubble Spring and Channel (BSAC) Valve: An Actuated, Bi-Stable Mechanical Valve for In-Plane Fluid Control. Transducers '99." Sendai, Japan; Jun. 7-10, 1999.
Eyal et al., "Velocity-independent microfluidic flow cytometry", Electrophoresis, Aug. 2002;23(16):2653-7 (abstract only, if the examiner desires the full article please contact).
Farooqui et al. "Microfabrication of Submicron Nozzles in Silicon Nitride." Journal of Microelectromechanical Systems. 1992; 1(2):86-88.
Fiedler et al., "Dielectrophoretic Sorting of Particles and Cells in a Microsystem", Analytical Chemistry, May 1, 1998, pp. 1909-1915, 70-#9, American Chemical Society, USA.
Freemantle, "Downsizing Chemistry", Chemical & Engineering News, Feb. 22, 1999, pp. 27-39, 77-#8, American Chemical Society.
Fu et al., "A Microfabricated Flourescence-Activated Cell Sorter", Nature Biotechnology, Nov. 1999, pp. 1109-1111, 17, Nature America Inc., USA.
Fu et al., "An integrated miscrofabricated cell sorter." Analytical Chemistry. 2002;74(11):2451-2457.
Fuhr et al., "Biological Application of Microstructures", Topics in Current Chemistry, 1997, pp. 83-116, 194, Springer-Verlag, Germany.
Gambin et al. "Microfabricated Rubber Microscope Using Soft Solid Immersion Lenses." Department of Applied Physics, California Institute of Technology. Applied Physics Letters 88, 174102 (2006).
Giddings, "Chemistry 'Eddy' Diffusion in Chromatography." Nature. 1959;184:357-358.
Giddings, "Field-Flow Fractionation: Analysis of Macromolecular, Colloidal, and Particulate Materials." Science. 1993;260:1456-1465.
Giddings, "Unified Separation Science." John Wiley & Sons, Inc. 1991; Cover Page & Table of Contents only.
Han et al., "Separation of Long DNA Molecules in a Microfabricated Entropic Trap Array." Science. 2000;288: 1026-1029.
Huang et al., "A DNA prism for high-speed continuous fractionation of large DNA molecules." Nature Biotechnology. 2002;20:1048-1051.
Huang et al., "Role of Molecular Size in Ratchet Fractionation." 2002; 89(17):178301-1-178301-4.
Huang et al., "Electric Manipulation of Bioparticles and Macromoledules on Microfabricated Electrodes", Analytical Chemistry, Apr. 1, 2001, pp. 1549-1559, 73-#7, American Chemical Society, USA.
Huh et al., "Gravity-driven microhydrodynamics-based cell sorter (microHYCS) for rapid, inexpensive, and efficient cell separation and size-profiling." 2nd Annual International IEEE-EMBS Special Topic Conference on Microtechnology in Medicine and Biology. Madison, Wisconsin USA; May 2-4, 2002:466-469.
Jeon et al., "Generation of Solution and Surface Gradients using Microfluidic Systems", Langmuir, 2000, pp. 8311-8316, 16-#22, American Chemical Society, USA.
Kamholz et al., "Quantitative Analysis of Molecular Interaction in a Microfluidic Channel: the T-Sensor", Analytical Chemistry, Dec. 1, 1999, pp. 5340-5347, 71-#23, American Chemical Society, USA.
Kenis et al., "Microfabrication Inside Capillaries Using Multiphase Laminar Flow Patterning", Science, Jul. 2, 1999, pp. 83-85, 285, American Association for the Advancement of Science, USA.
Kim et al. Polymer microstructures formed by moulding in capillaries. Nature. 1995;376:581-584.
Kumar et al. Cell Separation: A Review. Pathology. 1984;16:53-62.
Li et al, "Transport, Manipulation, and Reaction of Biological Cells On-Chip Using Electrokinetic Effects", Analytical Chemistry, Apr. 15, 1997, pp. 1564-1568, 69-#8, American Chemical Society, USA.
Lincoln et al., "High-Throughput Rheological Measurements with an Optical Stretcher", Methods in Cell Biology, vol. 83, 2007, pp. 397-423 (abstract only, if the examiner desires the full article please contact the attorney of record and a copy will be provided).

Martin et al., "Feeling with light for cancer", 2006, Progress in biomedical optics and imaging, vol. 7 (abstract only, if the examiner desires the full article please contact the attorney of record and a copy will be provided).
McClain et al., "Flow Cytometry of *Escherichia coli* on Microfluidic Devices", Anal. Chem., 73 (21), 5334-5338, 2001 (abstract only, if the examiner desires the full article please contact the attorney of record and a copy will be provided).
Mehrishi et al. "Electrophoresis of cells and the biological relevance of surface charge." Electrophoresis. 2002;23:1984-1994.
MicCell™ Parts List, GeSiM, www.gesim.de, 2007, 2 pages.
MicCell™ Special Designs (Selection), GeSiM, www.gesim.de, date unknown, 2 pages.
Moore et al. Lymphocyte fractionation using immunomagnetic colloid and a dipole magnet flow cell sorter. J Biochem Biophys Methods. 1998;37:11-33.
Oakey et al., "Laminar Flow-Based Separations at the Microscale", Biotechnology Progress, Sep. 24, 2002, pp. 1439-1442, 18-#6, American Chemical Society and the American Institute of Chemical Engineers, USA.
Olson et al., "An in Situ Flow Cytometer for the Optical Analysis of Individual Particles in Seawater", found at http://www.whoi.edu/science/B/Olsonlab/insitu2001.htm, publication date unknown.
Pamme et al., "Counting and sizing of particles and particle agglomerates in a microfluidic device using laser light scattering: application to a particle-enhanced immunoassay", Lap Chip, 2003, 3, 187-192.
Product literature for GEM, a systme for blood testing: "GEM PCL Step by Step Guide" and "GEM Premier 3000", publication date unknown.
Raymond et al. "Continuous Separation of High Molecular Weight Compounds using a Microliter Volume Free-Flow Electrophoresis Microstructure." 1996;68:2515-2522.
Takayama et al. "Patterning Cells and Their Environments Using Multiple Laminar Fluid Flows in Capillary Networks", Proceedings of the National Academy of Sciences of the United States of America, May 11, 1999, pp. 5545-5548, 96-#10, national Academy of Sciences, USA.
Takayama et al. "Subcellular Position of Small Molecules", Nature, Jun. 28, 2001, p. 1016, 411, Nature Publishing Group (USA), a division of Macmillan Publishers Ltd., United Kingdom.
Terray et al., "Microfluidic Control Using Colloidal Devices", Science vol. 296, Jun. 7, 2002, pp. 1841-1844.
Tong et al. Low Temperature Wafer Direct Bonding. Journal of Microelectromechanical Systems. 1994;3:29-35.
Turner et al. Confinement-Induced Entropic Recoil of Single DNA Molecules in a Nanofluidic Structure. Physical Review Letters. 2002;88:128103.1-128103.4.
Vezenov et al. "Integrated Fluorescent Light Source for Optofluidic Applications." Department of Chemistry and Chemical Biology, Harvard University. Applied Physics Letters 86, 041104 (2005).
Voldman et al. Holding Forces of Single-Particle Dielectrophoretic Traps. Biophysical Journal.2001;80:531-541.
Volkmuth et al. DNA electrophoresis in microlithographic arrays. Letters to Nature (1992) vol. 358; p. 600.
Weigl et al., "Microfluidic Diffusion-Based Separation and Detection", Science, Jan. 15, 1999, pp. 346-347, 283-#5400, American Association for the Advancement of Science, USA.
Wolfe et al. "Dynamic Control of Liquid-Core/Liquid-Cladding Optical Waveguides." Department of Chemistry and Chemical Biology. Harvard University. Aug. 24, 2004, vol. 101, No. 34. pp. 12434-12438.
Xu et al. Dielectrophoresis of human red cells in microchips. Electrophoresis. 1999;20:1829-1831.
Zhang et al. High-speed free-flow electrophoresis on chip. Anal Chem. 2003;75:5759-5766.
"Fiber Coupled LED Source and Accessories" http://www.wt-technology.com/LED.htm, printed May 16, 2011, 1 page.

* cited by examiner

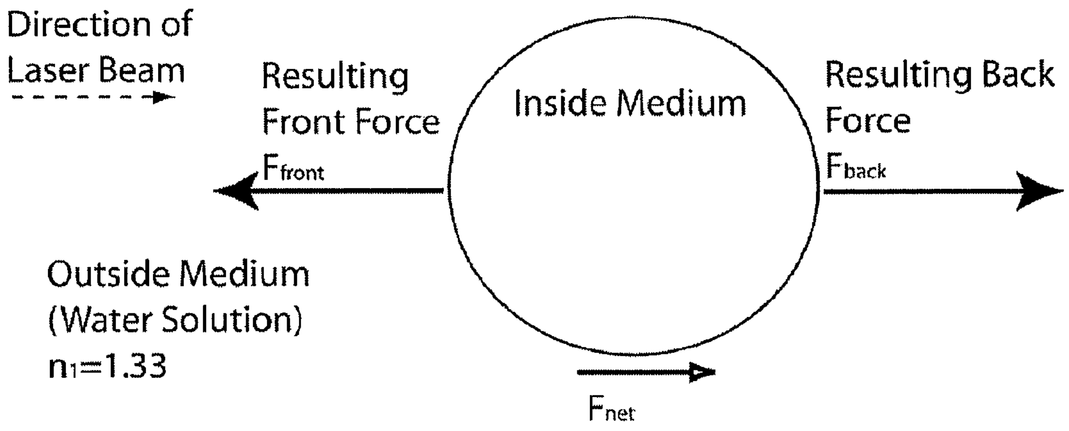
FIG. 1a
FIG. 1b
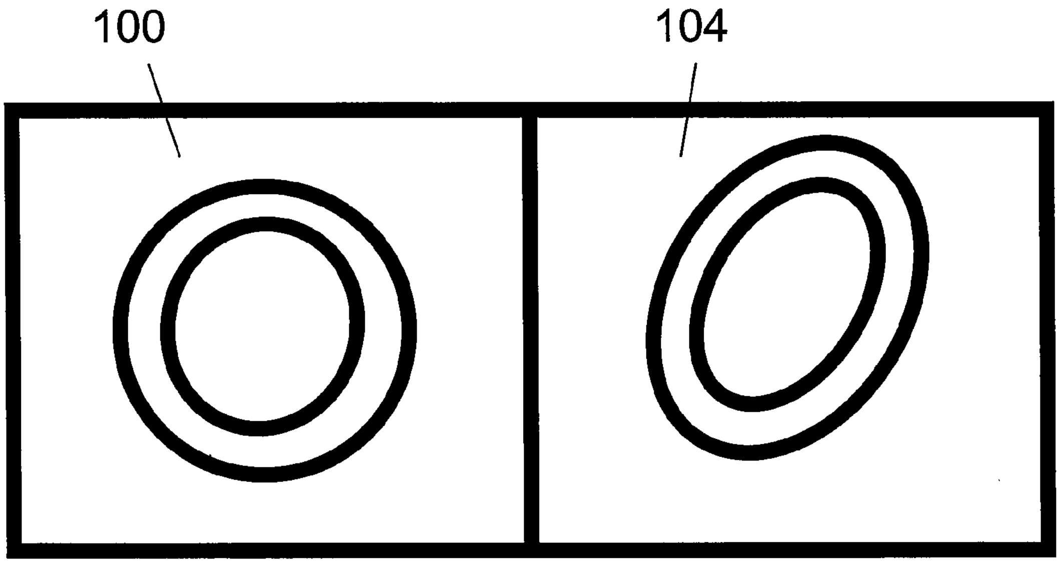

FIG. 4
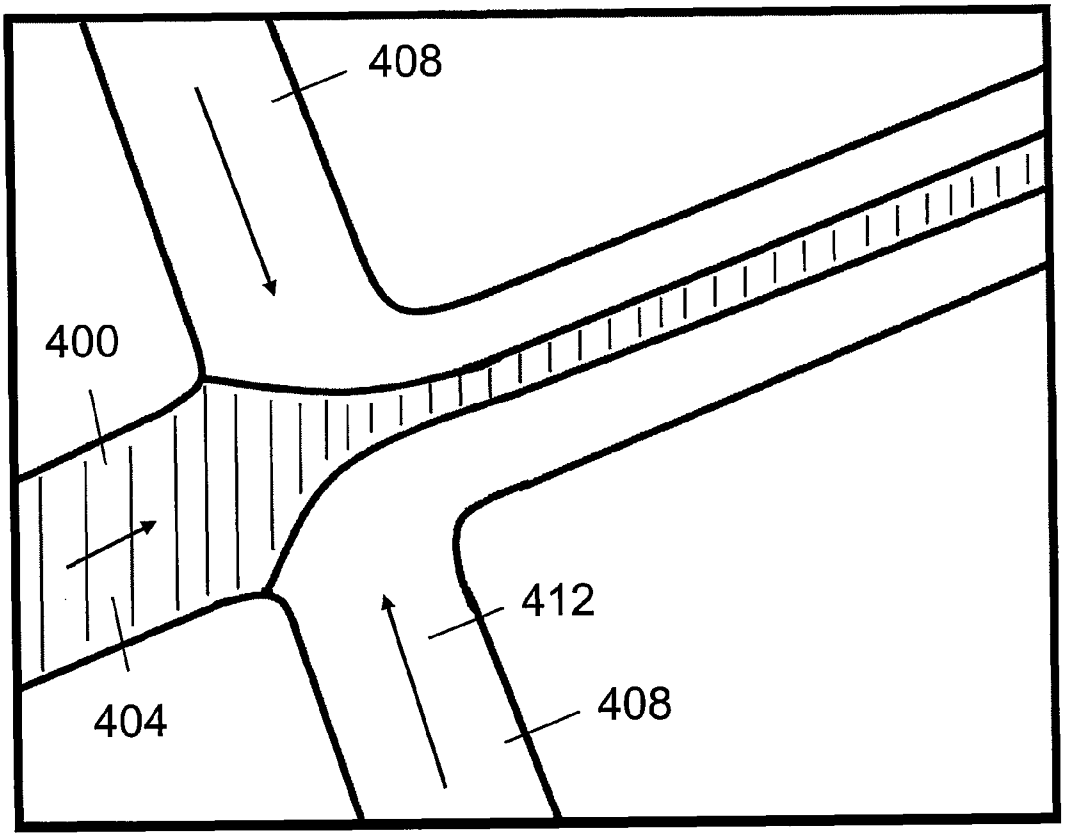
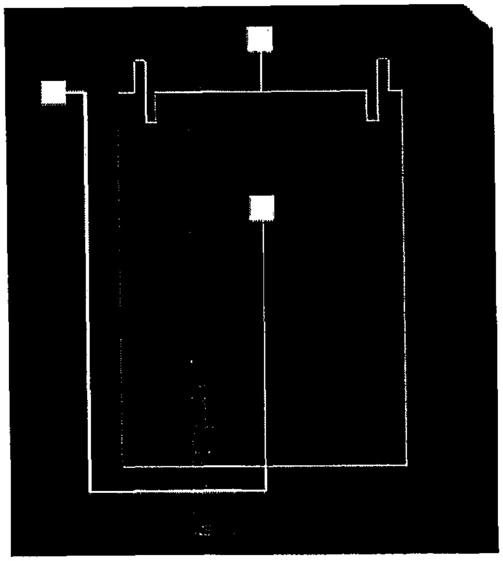
FIG. 5

OPTICAL-BASED CELL DEFORMABILITY

CROSS-REFERENCE TO RELATED APPLICATIONS

This application claims the benefit of U.S. Provisional Application No. 60/947,899, filed Jul. 3, 2007, the entire disclosure of which is hereby incorporated herein by reference.

The U.S. Government has a paid-up license in this invention and the right in limited circumstances to require the patent owner to license others on reasonable terms as provided for by the terms of DBI-0454686 awarded by the National Science Foundation.

FIELD OF THE INVENTION

The invention relates to laser configurations within microfluidic systems, among other systems, and optical-trapping based cell deformability measurements performed within dynamic, flowing systems.

BACKGROUND OF THE INVENTION

Many bioanalytical applications require cell sensing or detection. Fluorescence detection methods represent the most common choice; they are extremely widespread due to their sensitivity, selectivity, and ease of optical setup. However, fluorescence detection requires labeling, typically with fluorophore-antibody conjugates, which brings a number of disadvantages: (i) these conjugates have shelf-life limitations and storage requirements, (ii) the reagent adds to the cost of the test, which scales with the number of cell types to be identified (i.e. number of reagents in the device), (iii) most importantly, a specific reagent must be developed for each different cell type, therefore one must decide in advance which cell types are to be detected.

SUMMARY

It would be remarkably useful to implement a general, reagentless method akin to morphological examination that could be used as a "first-pass" means of identifying the cell types in a sample and determining use of specific reagents. Such devices would not require careful storage (e.g. refrigeration) or the disposal of potentially toxic reagents. These issues are all critical for lowering the cost and increasing the availability of practical bioassaying platforms for both laboratory and portable, point-of-care applications.

Several different techniques such as micropipette aspiration, atomic force microscopy, and microfiltration have been used to measure cellular cortical tension and viscosity, which can in turn be used to identify cell types. However, optical trapping based techniques have fairly recently been used to probe cell mechanical properties directly through drag-based deformation and with attached colloids. Käs and coworkers recently developed a "stretching" technique in which a cell trapped between two counter-propagating, divergent optical beams is elongated along the axis connecting the two beams. This effect is due to momentum transfer from the light to the cell as it propagates through the interface between the cell membrane and the surrounding solvent. Cellular elongation is measured by image processing. Stretching of red blood cells ranging from a few percent increase in length to complete destruction has been observed. The deformability estimated by optical stretching correlates well with measurements by pipette microaspiration. Remarkably, optical stretching is able to resolve the subtle differences in cytoskeletal remodeling and distinguish between normal, cancerous and metastatic mouse fibroblast and human breast epithelial cells. Details of this technique can be found, for example, in U.S. Pat. No. 6,067,859 to Käs et al., the entire disclosure of which is hereby incorporated herein by reference in its entirety.

Embodiments of the present invention are adapted to harness the high sensitivity of this technique for distinguishing cell types via a high throughput optical stretcher with integrated optics in a microfluidic environment.

Microfluidic environments and microfluidic flows correspond to fluid systems on a micro scale where the fluid flow is smooth and layered (i.e., laminar/non-turbulent co-existing fluid flows). The volumetric fluid flows in a microfluidic system are on the order of nl/min, and the microfluidic channel geometry is on the order of tens to hundreds of μm. These small geometries typically correspond to small Reynolds numbers, defined as $$Re = \frac{\rho v L}{\mu}$$

where ρ is the density of the system, ν is the average fluid velocity, μ is the dynamic velocity, and L is the characteristic system length scale. The Reynolds number for a microfluidic system typically falls within the range of about $10^{-4}<Re<10$, especially in laminar and ultra laminar flow regimes. Under these flow conditions the only mixing is via diffusion; convective mixing is not present.

One of the characteristics of laminar flow is its inherent lack of turbulence and smooth flow velocity profiles. In accordance with at least some embodiments of the present invention, the microfluidic flow systems may utilize a laminar flow to carry cells or the like across a laser beam where they are stretched and analyzed. The systems may be aqueous with a constant density and viscosity (Newtonian), and may be described with the Navier-Stokes equations:

$$\rho \frac{Dv}{Dt} = -\nabla P + \mu \nabla^2 v + \rho g$$

where P is pressure, t is time, ρ is density, μ is viscosity, and g is the gravitational force. For micro-scale geometries, gravity can be neglected because the body force is small for small fluid volumes. In addition, for low Re the inertial terms in the Navier-Stokes equation can be ignored. Under these circumstances, one has "Stokes flow" which can be well modelled via the following equation, which also describes any microfluidic flows utilized in accordance with embodiments of the present invention:

$$\nabla P = \mu \nabla^2 v$$

The flexibility of eukaryotic cells depends primarily on the cytoskeleton, which is comprised of actin filaments, microtubules, and intermediate filaments. The related cellular mechanical properties are a marker of cell health, and mechanical dysfunctions lead to significant adverse health effects. For example, the deformability of malignantly transformed cells is known to be larger than that of normal cells, and contributes to their motility, enabling them to migrate from the source and spread throughout the body (i.e. metastasize). In the context of hematology, cell rheology is a well-known factor in microcirculation. Erythrocytes and leukocytes must deform significantly to pass through the smallest blood vessels. Although the abnormal morphology of sickle cells is well known to cause impaired circulation, their decreased deformability is also a cause of impaired microcirculation. This approach to determining cell type and function could lead to cheaper and useful lab and clinical bioanalysis.

It is one aspect of the present invention to provide a high-throughput system that can be adapted to deform and measure the deformation of particles flowing through a microfluidic channel.

It is another aspect of the present invention to provide a system, method, and apparatus that is capable of changing the orientation of one or more objects. The method according to at least some embodiments of the present invention may comprise:

providing one or more objects capable of being oriented by electromagnetic radiation; and illuminating the one or more objects with a single beam of electromagnetic radiation sufficient to change the orientation of the one or more objects from a first to a second orientation.

The method may be practiced in a number of different system configurations. A first configuration is a high-throughput configuration where the objects (e.g., cells (blood cells, fetal cells, sickle cells, and the like), beads, colloids, pollutants, particulates, etc.) are deformed and their deformation is measured while the objects are flowing in a microfluidic channel. A second configuration is a scanning configuration where the objects are stationary and a laser is scanned across the objects. As the laser is scanned across the objects the deformation of the objects are measured and analyzed. A third configuration is a static configuration where the object and laser are both stationary. The cross-sectional profile of the laser may be altered while the object is being irradiated by the laser. As the cross-sectional profile of the laser is altered, the object may be deformed and its deformation may be measured. Other possible configurations will become apparent to those skilled in the art after reviewing the contents of this disclosure.

In accordance with at least some embodiments of the present invention, a system is provided with the ability to quickly, and with or without the use of reagent labeling, identify a cell and more specifically the type of cell that is present in a fluid sample. This may be accomplished by passing a fluid sample having a number of cells therein through a microfluidic channel under laminar flow conditions. As the cells pass through the microfluidic channel, cell orientation and stretching forces may be applied to the cell to invoke a cellular reaction to the forces. The orientation and stretching forces may be applied by way of optical forces from two collinear and similar laser diodes. Alternatively, the orientation and stretching forces may be applied by way of an optical force from a single laser diode.

In accordance with at least some embodiments of the present invention, there may be situations where labelling is used to separate out some subset of a large population (i.e., a coarse sort) and mechanical property testing may then be used to identify something specific within that subset (i.e., a fine sort). The coarse sort and/or fine sort may be accomplished by applying cell orientation and stretching forces to the cells. Other known sorting methods may also be applied in either the coarse sort or fine sort.

The process of optically trapping a cell and applying forces helps to impart stresses on the cell, which result in a characteristic reaction to the forces. Based on the cell's reaction to the stretching forces applied thereto as well as an understanding of cell mechanics and hydrodynamics, the type of cell within the fluid sample may be identified. Thus, a system is provided with the ability for measuring cellular deformability during a high-throughput of the cells with respect to the microfluidic channel.

It is another aspect of the present invention to also provide a way of altering the orientation of a cell or similar object (e.g., by rotating the cell, particle, pollutant, colloid, bead, etc.) through the use of optical forces. In accordance with at least one embodiment of the present invention, an optical force applied to a cell or similar object may be sufficient to cause the cell to have a particular orientation, especially when the cell or object is asymmetric in physical shape (i.e., is not perfectly circular/spherical) or asymmetric in some other inherent property (e.g., index of refraction, chemical structure, etc.). The optical forces applied to an asymmetric cell or similar object may cause the cell or similar object to align itself with the direction of application of the optical force. Thus, the orientation of the cell is altered from a first position to a second position that conforms to the light applying the optical force.

The re-orientation of particles in a high-throughput system helps to increase the accuracy of particle counting as well as standardize the orientation of particles prior to deformation and measurement. In accordance with at least one embodiment of the present invention, the same source of light that is used to re-orient the cell or similar object may also be used to deform the cell or similar object. This may be accomplished by applying a first optical force with the optical source that is sufficient to re-orient the cell or similar object and then applying a second larger optical force with the same optical source that is sufficient to deform the cell or similar object. The application of the first optical force may be applied upstream in the microfluidic channel as compared to the point where the second optical force is applied to the cell or similar object.

It is yet another aspect of the present invention to provide a mechanism for executing colloidal synthesis and/or tissue engineering. In accordance with at least one embodiment of the present invention cell alignment and/or deformation may be facilitated by application of optical forces to the cell. While the cell has a preferred alignment and/or deformation, the cell may be cured with the application of a curing means (e.g., the application of UV light to the cell may be a means of curing the cell) thereby preserving the preferred alignment and/or deformation of the cell. Colloidal synthesis and/or tissue engineering via a deformation and curing method may be useful to mark certain cells. For example, once a cell has been cured in a preferred alignment and/or deformation that particular cell can be uniquely identified among a plurality of otherwise similar cells that do not have the same alignment and/or deformation. In this sense, providing the ability to cure a cell in a preferred alignment and/or deformation may allow a relatively non-invasive way of tagging cells for later analysis.

In a more particular tissue engineering application, a collection of cells may be scanned with a light source that provides an optical force sufficient to create a preferred orientation (i.e., preferred cell alignment and/or deformation) in each cell in the collection of cells. Once a preferred orientation is achieved, the cells may be cured (e.g., via application of light having a predetermined wavelength to the cells) thereby causing the collection of cells to all have the preferred orientation. By fixing a collection of cells in a preferred orientation it may be easier to grow/add additional cells along the same preferred orientation without continually orienting and curing the added cells. Additionally, a collection of cells that are configured in a preferred orientation may exhibit certain advantageous qualities, such as a stronger cell structure as compared to a collection of cells that do not have the same preferred orientation.

Additional features and advantages of embodiments of the present invention will become more readily apparent from the following description, particularly when taken together with the accompanying drawings.

BRIEF DESCRIPTION OF THE DRAWINGS

FIG. 1*a* depicts a schematic drawing of forces that can be exerted on a particle by a light source in accordance with at least some embodiments of the present invention;

FIG. 1*b* depicts a series of images captured of a deformed cell in accordance with at least some embodiments of the present invention;

FIG. 4 depicts a high-throughput flow-based optical mechanical testing where hydrodynamically-focused cells are passed through a microfluidic channel in accordance with at least some embodiments of the present invention;

FIG. 5 is a diagram depicting an exemplary photomask for use in production of a microfluidic channel system for hydrodynamic focusing in accordance with at least some embodiments of the present invention;

DETAILED DESCRIPTION

Figure 2:
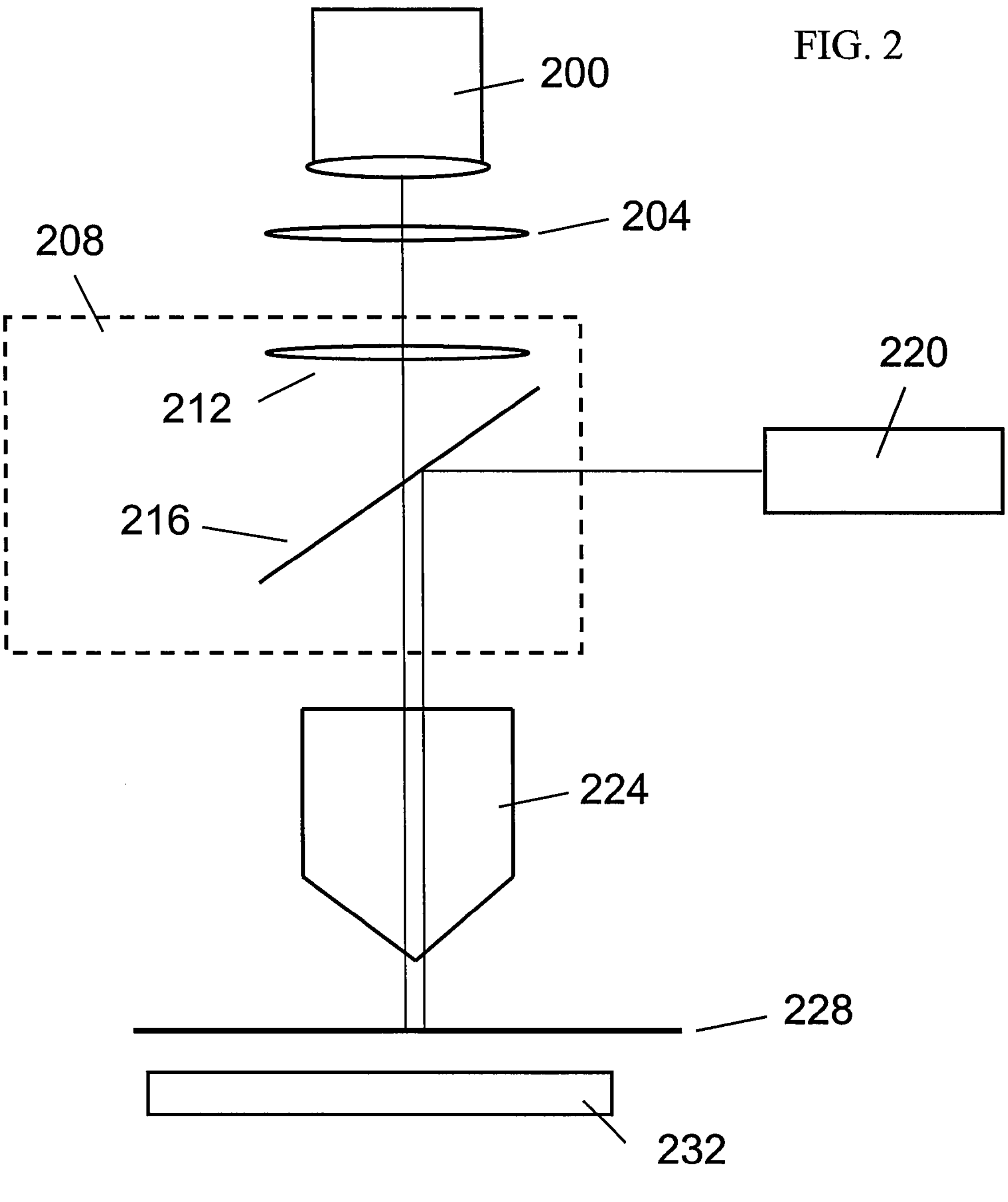
FIG. 2 is a block diagram depicting an imaging portion of a system setup in accordance with at least some embodiments of the present invention.

With reference now to FIG. 1*a*, details of orientation/deformation forces that can be exerted on a particle by a light source will be described in accordance with at least some embodiments of the present invention. Cells stretch in an optical system due to the same forces that cause them to be trapped in a laser beam. Not only does a laser exert a force to pull the particle into the Gaussian distribution of the laser, but it also exerts a small force in the negative z direction (downwards), pushing the particle away from the focal point.

This momentum transfer at the surface of some types of deformable particles causes the stretching force used to orient and/or deform cells. FIG. 1*a* specifically diagrams the forces acting on a particle when exposed to a single laser beam. When a particle is exposed to two opposing laser beams, the Fnet is cancelled out, and in systems that have deformable membranes, there is a deforming force that acts on the particle. It is possible to use two diverging laser beams at powers between 100 and 800 mW at 785 nm to supply the stretching force necessary for each other technique is that only one cell can be measured at a time. In order to make measurements, the cell must be trapped, the power must be increased, the measurements must be made and the cell must be let go. This dual-beam, non-high-throughput system has resulted in a maximum reported cell measuring rate of 100 cells/hr. However, due to the disparity in biological systems, larger sample sizes are preferred, and the stretching techniques presented in the prior art must be re-examined.

Thus, at least some embodiments of the present invention utilize a single laser to provide the re-orientation/stretching force for a cell. A tightly focused laser will push a particle until it hits the far side of a channel (i.e., a stream within a microfluidic channel), where the front and back forces will take over and induce a stretching force in the cell. For a single laser design the stretching force can be slightly less efficient as a function of intensity than a dual-laser design due to the net force pushing the cell against a surface. However, there is still enough deformation imparted on a cell with a single laser beam to measure and quantify cell deformation. The chief advantage lies in the fact that single diode stretching is an excellent system to model single optical source stretching.

Referring now to FIG. 1*b*, an exemplary set of images rendered for a stretched particle will be described in accordance with at least some embodiments of the present invention. An unstretched cell is depicted in a first image 104 and a stretched cell is depicted in a second image 108. The images may be captured and generated using any type of known image capturing and processing technique. As an example, the images depicted in FIG. 1*b* may be obtained by performing image processing techniques on video image frames obtained from a video camera. In accordance with at least one embodiment of the present invention, video (i.e., a plurality or sequence of images) may be captured for a cell before, during, and after re-orientation and/or deformation. An image processing routine may be applied to the captured video input or a subset thereof. The routine may adjust the gamma, brightness, and contrast of the input video images in real-time. Then a binary image processing algorithm may be applied to selected images from the video sequence.

In accordance with one embodiment of the present invention, one frame every 70 ms may be captured and stored in memory for processing. Once a frame is captured, a background image can be subtracted from the image, thereby isolating the image of the cell or particle under inspection. The contents of the background image may be determined by taking an image without any cells present in the camera view. The pixel values of this image may then be utilized as the background image that is subtracted from all subsequently captured images. After the background image is subtracted from an image having a cell in it, the image processing algorithm continues by equalizing the image. In one embodiment, the original images may be captured in 8-bit grayscale. The equalization function can alter the gray-level values of the pixels in the image so they become evenly distributed over a fixed range of about 0 to about 255.

Following equalization of the image, a threshold may be applied to the image such that the image is converted from an 8-bit grayscale image to a binary image (i.e., an image where each pixel can either be a 1 or 0). The value of the threshold may depend upon the quality of the image captured, the nature of the particle under inspection (i.e., different thresholds may be applied depending upon whether a cell or pollutant is being viewed) as well as the areas of interest in the image. In accordance with at least one embodiment of the present invention, the threshold can be set to capture an outer surface and inner ridge of a cell. Additional image processing techniques can be applied to the binary image to further improve its quality before it is analyzed for deformation/orientation information. For instance, the binary image may be "closed" to remove any pixel holes and smooth rough borders left from application of the threshold. Then a low-pass filter can be applied to the binary image to remove small particles or pixels. The particles can then be solidified using a fill holes function, which causes any blob touching a border to be rejected and a low pass remove-small-particle filter is applied once more to the image. This may yield an image of the cell as binary blob, for example.

After the image has been adequately processed, a particle analysis function can be applied to analyze the image and further apply a time-stamp to the image that identifies when the image was taken. The time stamp can help the analysis of a plurality of images taken from a single video input over the course of time.

An initial-terminal frame analysis algorithm can be used to analyze measurements taken of a processed image. In the analysis algorithm, the processed binary image can be parsed to remove aspherical particles as well as other particles that are known to be too large or too small to correspond to the particle under analysis. The determination of these parsing values may be determined by applying the Heywood Circularity Factor, which is defined as the perimeter of a particle divided by the circumference of a circle with the same area. A value of 1.00 in this factor corresponds to a perfect circle. Thus, to filter out cells or other particles that were incompletely imaged in a frame, only particles that have a Heywood Circularity Factor of less than 1.2 are used. The remaining pixels depicting the cell or particle of interest can then be analyzed for deformation and orientation information.

A robust image analysis may include the calculation of the Equivalent Ellipse Minor Axis (EEMA) and the particle orientation. The EEMA measures the length of the minor axis of an ellipse that has the same perimeter as the area of the particle. The EEMA measurement works well to normalize out any deformations and allows for measurements to be made on multiple cells per screen regardless of the orientation. It is also robust enough to minimize the error due to the video processing and works well for cell shapes that are not fully spherical. The equation used to calculate EEMA is depicted as follows:

$$EEMA = \sqrt{\frac{P^2}{2\pi^2} + \frac{2A}{\pi}} - \sqrt{\frac{P^2}{2\pi^2} - \frac{2A}{\pi}}$$

where P is the determined particle perimeter and A is the calculated area of a circle with the area corresponding to the determined particle perimeter.

The particle orientation may be defined as "the angle of a line that passes through the particle center of mass about which the particle has the lowest moment of inertia." Particle orientation may be determined relative to a stationary or reference axis (e.g., a vertical or horizontal axis). Thus, a particle that is oriented with its lowest moment of inertia being collinear with the reference axis may have an orientation of zero degrees or 180 degrees. Similarly, a particle that has its lowest moment of inertia normal to the reference axis may be regarded as having an orientation of either 90 degrees or 270 degrees.

When the above-described algorithms are used in low-resolution images a small amount of noise may be introduced to the image. The noise present in the analysis technique may be introduced as a measure of error in stretch determination. The cell depicted in FIG. 1*b* shows how optical forces applied by a single beam laser can deform and/or re-orient a cell during its passage through a microfluidic channel, for example.

A system setup used to capture images of cell re-orientation and/or deformation by optical forces may be divided into two cooperative components. One component of the system setup may include the imaging component used to capture images of cells and other particles that are re-oriented by optical forces. The other component of the system setup may include the optical trapping components and microfluidics that facilitate the deformation of a number of cells and other particles in a high-throughput environment.

Referring now to FIG. 2, further details of the imaging portion of a system setup will be described in accordance with at least some embodiments of the present invention. The system may comprise an image/video capturing device 200, a zoom lens 204, a filter set 208 including a filter 212 and mirror 216, a light source 220, an objective 224, a sample 228, and optical trapping equipment 232 (see FIG. 3). In accordance with at least one embodiment of the present invention, additional filter sets may be used. The optics illustrated in FIG. 2 may be integrated into a Ziess Axioplan 2 Microscope.

The image/video capturing device 200 may include, for example, a Watec CCD camera (model No. WAT-502A). The light source 220 may include a mercury shot arc photo optic lamp housed in a HBO 100 housing. The light source 220 is employed to provide substantially even illumination over the visible area of the camera image/video capturing device 200.

The filter set 208 can be placed in the microscope's filter wheel so they can be readily switched. The filter set's 208 objective can be used to reflect a portion of the laser light and a neutral density filter can also be used to remove another fraction of the laser beam. A second filter can be used with the purpose to block the laser from the camera 200 for cell imaging. This allows for a reduced intensity beam that can be focused to the proper imaging plane. One of the filter sets may comprise an 800 m high reflectivity (HR) mirror and a neutral density filter. Another of the filter sets may comprise a dichroic mirror and an 810 nm band rejection filter.

The objective can be rotated between a 2.5× objective (NA 0.075), a 10× objective (NA 0.3), a 20× objective (FIG. 35, NA 0.5), and a 40× objective (NA 0.6). Images taken with the image/video capturing device 200 can then be imported to processing equipment (e.g., a personal computer, laptop, server, or the like) where the image analysis and processing algorithms described above are applied to the captured images.

Figure 3:
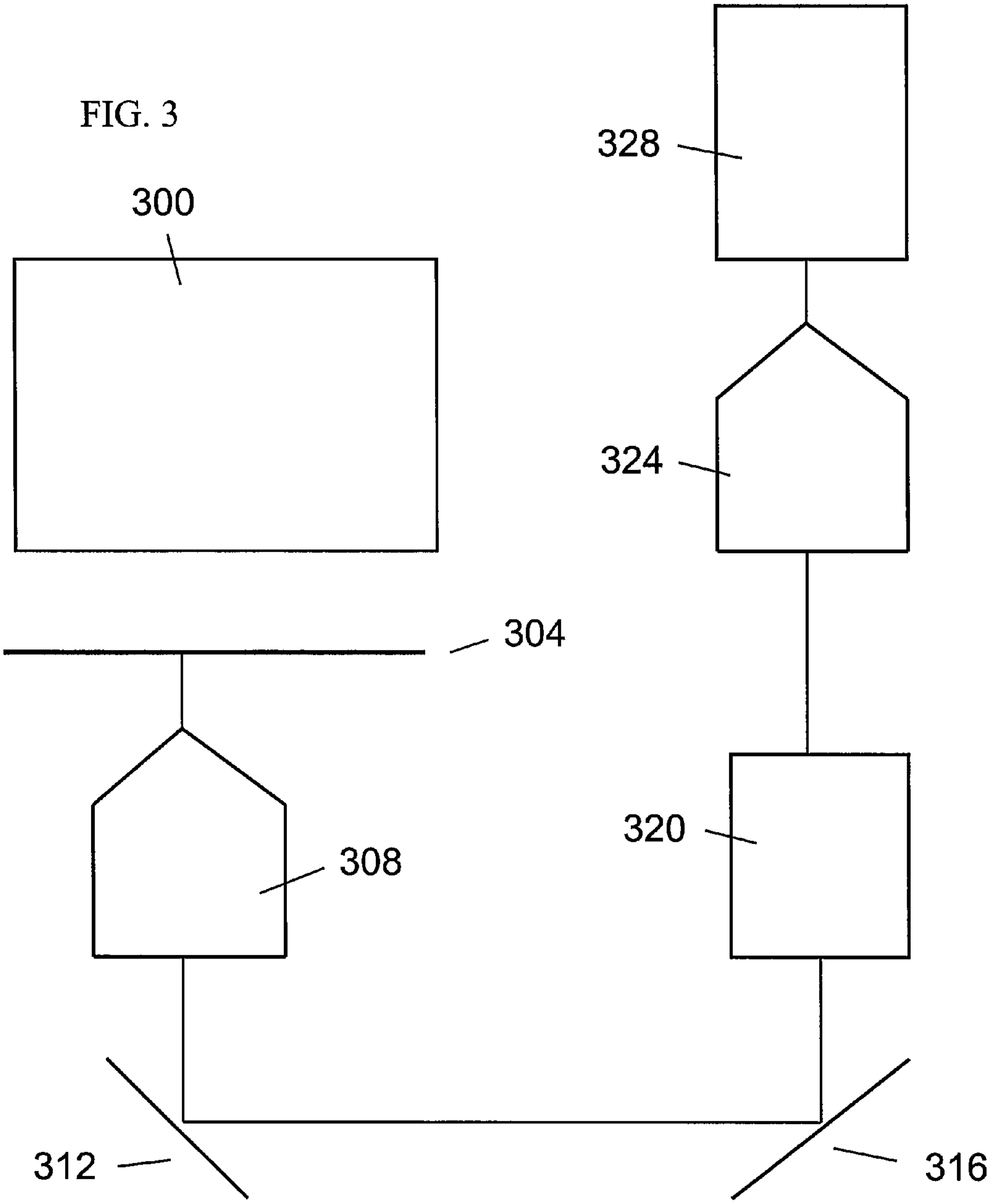
FIG. 3 is a block diagram depicting an optical trapping setup in accordance with at least some embodiments of the present invention.

Referring now to FIG. 3, the trapping set up will be described in accordance with at least some embodiments of the present invention. The trapping setup may include the imaging setup 300 (from FIG. 2), a sample 304, a first optical objective 308, a first mirror 312, a second mirror 316, an optical bandpass filter 320, a second optical objective 324, and an optical source 328. Although only one optical trapping setup is depicted in FIG. 3, one skilled in the art will appreciate that many different optical trapping setups may be utilized without departing from the spirit of the present invention. One possible trapping setup may include the use of an 808 nm 5000 mW diode bar laser (Snoc Electronics Co, China) that is 200×1 μm as the optical source 328. An alternative optical trapping setup may include the use of an 830 nm laser diode with an elliptical spot as the optical source 328.

Either one of these lasers can be integrated into the setup illustrated in FIG. 3 as the optical source 328 without changing any other equipment. Other types of optical sources 328 can include, without limitation, a gas laser, a chemical laser, an eximer laser, a solid-state laser, a fiber laser, a diode laser, and a dye laser.

In accordance with at least some embodiments of the present invention, small pressure differentials on the order of 250 Pa can be used to control fluid flow through the sample 304. In one embodiment, a set of 3 ml syringes open to the atmosphere can be connected to 500 μm diameter silicon tubing, which interfaces with the microfluidic channel of the sample 304. The pressure drop can be adjusted to 10 Pa per turn of the micrometer.

The optical trapping setup may be used to re-orient and/or deform cells and other particles that are carried by the sample 228, 304. In accordance with at least one embodiment of the present invention, a single laser beam generated by the optical trapping setup may be applied to cells or other particles that pass through the sample 228, 304 as they pass through the sample 228, 304. The speed of the cells passing through the sample 228, 304 can be maintained at a substantially constant speed both during application of the optical forces to the cell or particle as well as during the analysis of the cell's or particle's reaction to the optical forces. Thus, the cell or particle may continue to flow in a first direction while it is re-oriented, deformed, and/or analyzed.

With reference now to FIG. 4, further details of the sample 228, 304 setup will be described in accordance with at least some embodiments of the present invention. In accordance with one embodiment of the present invention, a sample 288, 304 may be carried through a microfluidic channel. In particular, an object containing fluid 400 may be flowed through a microfluidic channel 416 in the direction depicted by the arrow 404. The object containing fluid 400 may be hydrodynamically focused within the microfluidic channel 416 by one or more sheath fluid flows 408. The microfluidic channel 416 may comprise a first input for receiving the object containing fluid 400, a second input for receiving one of the sheath fluid flows 408, and a third input for receiving another of the sheath fluid flows 408. Thus, a middle stream carrying the object containing fluid 400 is focused using the sheath streams 408. For three-dimensional focusing the sample is usually injected into a faster moving sheath stream; however, for two-dimensional microfluidic focusing the sample stream is typically focused using two outside sheath streams as depicted in FIG. 4. Both a two-dimensional and three-dimensional microfluidic channel may be employed in accordance with embodiments of the present invention. Utilization of hydrodynamic focusing in a microfluidic environment allows a stream containing particulates (i.e., the object containing fluid 400) to be narrowed down to a width unobtainable using channel geometry alone. Here, due to the conservation of mass, focusing can increase the velocity between 2 and 20 times, depending on the width of the focus and properties of the fluids. Flow cytometers usually utilize hydrodynamic focusing in three dimensions, whereas microfluidic focusing is typically only performed in two dimensions due to the complexity in fabricating multilayer microfluidic devices.

The microfluidic devices utilized in accordance with at least some embodiments of the present invention may incorporate certain aspects of flow cytometry to obtain devices for the counting and sizing of cells. The low cost and ease of fabrication could eventually replace some of the roles of traditional expensive flow cytometers. For example, by using hydrodynamic focusing techniques in a microfluidic device it may be possible to obtain reliable counts with a throughput of 150 particles/s and distinguish between microspheres of 3 and 6 μm. Therefore, cells and other particles may be deformed, analyzed, identified (i.e., by type), and tagged (i.e., curing the cell or particle in a preferred orientation) as they flow through a microfluidic channel at a rate of up to about 150 particles/s. Furthermore, all of the deformation of the cells or particles may be facilitated by a single laser beam. This is a significant improvement over the prior art that was only able to obtain a throughput of about 100 cells/hour.

The process for creating microfluidic devices involves several fabrication steps. In one embodiment, the first step is a photolithography step that begins by selectively polymerizing a thin photoresist layer to create a template. Once the microfluidic channels are molded around the template, the device is assembled via a process known as rapid prototyping.

To create high-resolution structures using traditional photolithography for the production of microfluidic devices, a photomask is first designed and printed. An exemplary photomask that can be used in accordance with at least some embodiments of the present invention is depicted in FIG. 5.

In accordance with at least some embodiments of the present invention, the fabrication procedure begins with a silicon wafer of 110 crystalline cut spin coated with photoresist. The photoresist can be diluted with SU-8 2000 thinner in a 10:1 ratio of resist to thinner to allow for thicknesses under 25 μm. Approximately 2 ml of the photoresist can then added to the center of a silicon wafer in a spin coater. The wafer may then be first rotated at 500 rpm for 10 s to distribute the photoresist, and after 10 s at ≈3500 rpm for 30 s to obtain the desired resist thickness.

After the wafer is coated with the resist it can be placed in an oven at 65° C. for 45 min. This step, called the soft bake, drives off excess solvent in the photoresist and can also be performed on a hotplate and at varying temperature and time combinations. After the soft bake the wafer is left to cool to room temperature to allow solidification. After cooling the photomask can be placed in direct contact on top of the coated wafer, weighted down with a glass slide to ensure contact, and the resulting assembly illuminated with ultraviolet light.

Exemplary rapid prototyping steps include: a) Silicon wafer coated with photoresist, b) after the softbake a photomask is placed on top and the assembly is exposed to UV light, c) the unexposed areas of the photoresist are washed away, d) the finished wafer.

This method of contact exposure avoids the diffraction problems associated with proximity exposure. The UV lamp, with a peak wavelength at 365 nm, is used to illuminate the photoresist for a length of time that depends on the thickness of the photoresist, typically 20 mins for 25 μm thick photoresist. The next step is a post-exposure bake in an oven at 65° C. for 20 min to harden the exposed photoresist. After this, the wafer is placed in an SU-8 developer bath until the unexposed resist lifts off. The wafer is then blown off with nitrogen, yielding the final resist pattern on the silicon wafer.

Once the template is created the construction of microfluidic channels can be performed via an exemplary rapid prototyping method where poly(dimethylsiloxane) (PDMS) is poured over the template and cured. PDMS Sylgard 184 may be used due to its optical transparency and ease of use. In this the polymer and hardener can be mixed in a 10:1 by weight ratio thoroughly for several minutes, introducing a large number of air bubbles into the PDMS. To minimize the bubbles, the PDMS can then degassed in a moderate (<0.5 atm) vacuum for 40 min allowing it to cure with minimal optical deformities. After degassing the PDMS can be cured in an oven at 65° C. for 4 hr. Due to geometry constraints the substrate is a 45 mm×50 mm glass cover slip only 170 μm thick.

Possible rapid prototyping steps include: a) Si wafer is prepared; b) the wafer is covered in PDMS; c) after curing the PDMS is exposed to an oxygen plasma; and d) the PDMS is bonded to a glass coverslip.

To withstand moderate applied pressures of pump fluid in microfluidic geometries the elastomer (PDMS) can be bonded to the substrate. To bond to glass, the surface can be modified with hydroxyl groups leading to a condensation reaction when placed on another PDMS block or similar silica surface. Surface modification can be accomplished using a reactive ion etcher filled with argon and oxygen at 300 mTorr. The oxygen plasma can then be induced at 40 W for 5-10 s. After the exposure, the glass and PDMS surfaces can be brought into contact, forming an irreversible bond. Following the bonding procedure the samples can be allowed to sit for 45 min before a pressure drop is applied to ensure complete bonding.

Figure 6:
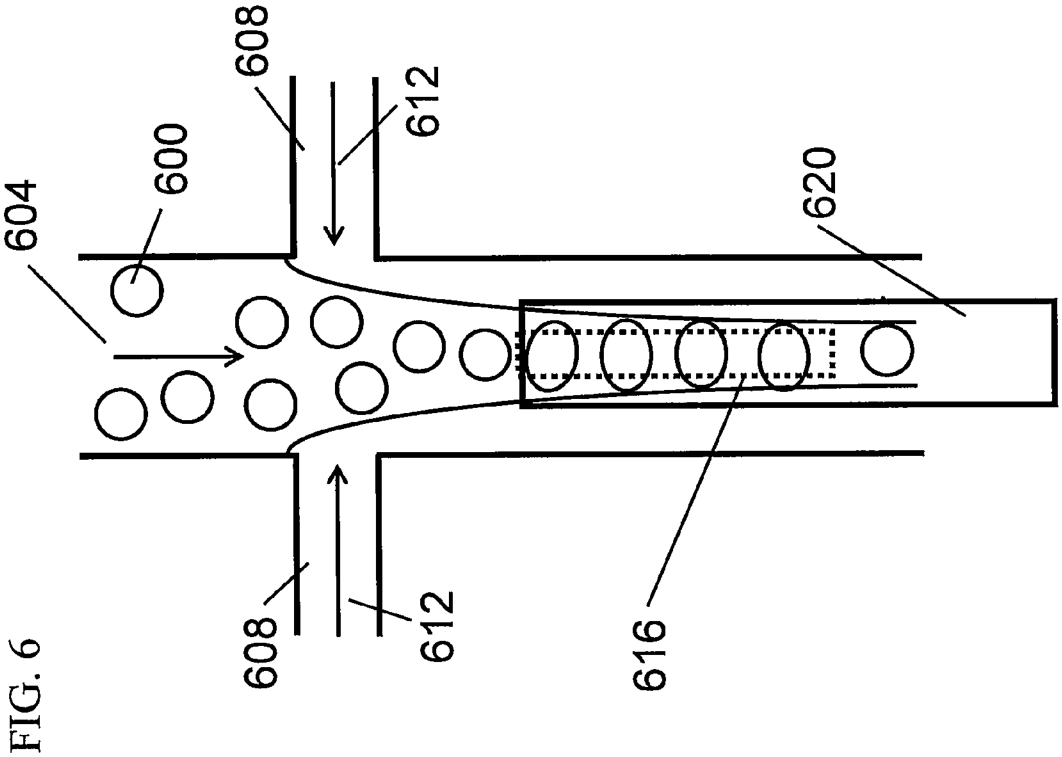
FIG. 6 is a diagram depicting a top view of the flow and orientation of cells in a high-throughput microfluidic channel in accordance with at least some embodiments of the present invention.

With reference now to FIG. 6, an exemplary high-throughput method and system for orienting, deforming, measuring, identifying, and tagging cells and other objects will be described in accordance with at least some embodiments of the present invention. As can be seen in FIG. 6, deformable objects 600 (e.g., cells, particles, pollutants, colloids, beads, or the like) are introduced to an inlet 604 of a microfluidic channel. The inlet 604 of the microfluidic channel is adapted to receive the fluid containing the deformable objects 600. The microfluidic channel may also include inlets 608 for receiving a sheath fluid flow 612. The sheath fluid flow 612 is used to direct and focus the fluid containing the deformable objects 600. In accordance with one embodiment of the present invention, the initial direction of sheath fluid flow 612 may be substantially orthogonal to the direction of particle containing flow.

In accordance with at least one embodiment of the present invention, the flows in the microfluidic channel are laminar or layered, meaning that the sheath fluid flow 612 does not mix with the fluid containing the deformable objects 600. As the objects 600 pass by the inlets 608 for receiving the sheath fluid flow 612 the object 600 are focused into a substantially single-file line (in two-dimensional space defined by the plane in which the microfluidic channel resides). As the objects 600 are focused into a single-file line, optical forces may be applied to the objects 600 by the optical trapping equipment 616.

In accordance with at least one embodiment of the present invention, the optical trapping equipment 616 may be oriented orthogonal to the microfluidic channel and therefore apply optical forces to the objects 600 in the same plane as the microfluidic channel (i.e., from right to left or left to right in FIG. 6). This is because the objects 600 are typically stretched along the long axis of the laser beam created by the optical source. The forces applied by the optical trapping equipment 616 may be applied by a single optical source (i.e., one laser beam) or by multiple optical sources (i.e., two or more laser beams applying, for example, opposing optical forces on the object 600). In the event that two laser beams are used to stretch the object 600, the optical trapping equipment 616 may be located in the same plane as the microfluidic channel to stretch the objects 600 along the plane of the microfluidic channel. In accordance with at least one embodiment of the present invention, the optical trapping equipment 616 may create an optical field or gradient across a length of the microfluidic channel. This causes substantially constant or progressively increasing optical forces to be applied to the objects 600 as they flow through the microfluidic channel (i.e., in the downward direction of FIG. 6). By applying the optical forces to the objects 600 while they are flowing, the objects 600 can be re-oriented and deformed without stopping the fluid flow at the inlet 604. This helps to create a high-throughput system and device for orienting and deforming objects 600.

Furthermore, imaging optics 620 may be positioned relative to the optical trapping equipment 616 thereby facilitating the measurement and analysis of the objects 600 as they are re-oriented and/or deformed by the optical forces applied by the optical trapping equipment 616. In the event that a single laser source trapping equipment 616 is used, the imaging optics 620 may be oriented in substantially the same plane as the optical trapping equipment 616 so that the deformation along the long axis of the laser can be observed by the imaging optics 620. In one embodiment, the imaging optics 620 and optical trapping equipment 616 may be located on opposite sides of the microfluidic channel from one another. In the event that multiple laser source trapping equipment 616 is used, the imaging optics 620 may be orthogonally positioned relative to the optical trapping equipment 616.

The imaging optics 620 may view the objects 600 as they flow through the microfluidic channel and are re-oriented and/or deformed by optical forces. Again, the re-orientation, deformation, and reaction to deformation of the objects 600 may occur as the objects 600 flow through the microfluidic channel. Moreover, the imaging optics 620 may continue to observe the objects 600 even after the objects 600 are released from deformation (i.e., after the optical forces are no longer applied to the objects 600). In accordance with at least some embodiments of the present invention, the objects 600 are stretched along the long axis of a single laser beam or between two laser beams in the same plane as the laser beams, and no relaxation occurs until the trap is either turned off or the objects 600 have flowed beyond the trap region.

To this end, the imaging optics 620 may be positioned further down stream in the microfluidic channel from the optical trapping equipment 616 in addition to having some overlap with the optical trapping equipment 616 in the microfluidic channel. In one embodiment of the present invention, the imaging optics 600 are used to measure the degree of deformation of the objects 600. Examples of the types of imaging optics 620 that may be utilized to measure such deformation may include, but are not limited to, optical microscopy detection, spectroscopic detection, electrophysiological detection, and scanning force microscopy detection systems.

In accordance with at least one embodiment of the present invention, the optical trapping equipment 616 may comprise a stretching laser that is an 808 nm diode laser with a maximum power in the image plane of 146 mW. Unlike a traditional optical trap, this laser has an elliptical spot where the major axis is 3 μm and the minor axis is 1 μm, corresponding to a maximum intensity at the sample plane of 62 mW/$\mu m^2$ assuming a top hat beam profile. At minimum power (where the lasing current of the diode is about 33 mA) the trapping power is about 8 mW, sufficient to trap a cell weakly without measurable deformation.

The orientation of 71 cells being trapped and stretched in the laser has been observed. In these studies, cell orientation was measured and quantified via image analysis using the particle orientation function described above. Specifically, $\phi$ is the angular difference between the laser and particle orientations. A positive value of $\phi$ corresponds to the cell being rotated clockwise from the laser and a negative value indicates the cell is rotated counterclockwise. In the measurements performed on 71 red blood cells, the average ϕ was 22.2°±1.5°. These measurements show that a large majority of cells can be oriented along the laser diode long axis and indicate that the cells compress to an ellipse roughly corresponding to the elliptical cross-sectional profile of the laser diode.

This stretching along the laser diode axis can be taken advantage of when considering a high throughput system using a 1D bar laser, with knowledge that cells will compress toward the short axis. With cell re-orientation possible, optical stretching with a single diode laser is now provided here for the first time. As discussed previously, the use of single diode lasers in the optical trapping equipment 616 has the significant advantage of being small, portable, and inexpensive, making them ideal for integrating into microfluidic systems.

For the high-throughput technique to work, the cell should also relax from a stretched position before flow removes it from the detection region of the microfluidic channel (i.e., the region corresponding to the view area of the imaging optics 620). The normalized stretch of cells can be described by the following equation:

$$\text{Norm stretch } \% = A \cdot e^{-t/\tau} + y0$$

Four cell's relaxation times measured utilizing the above equation and the following values were obtained: A=1.06±0.20,y0=−0.04±0.21, and $\tau^{-1}$=6.63±3.18 $s^{-1}$. This fit yields τ=0.15±0.07 s, a characteristic time of about 0.19 s that agrees with previous experiments using micropipette aspiration where the characteristic time was measured as 0.10 s<τ<0.13 s. Using this measured characteristic time, an estimate can be made of the maximum rate at which high throughput cell stretching and observation can be performed. Measuring one cell every 0.15 s yields a maximum sample rate estimation of 24,000 cells/hr, a value several orders of magnitude higher than the prior art's maximum rate of 100 cells/hr. This increase is due to a dramatic change in the methodology of cell deformation. Instead of measuring one cell at a time in flow, cells are measured in a steady state continuous fashion using a diode bar laser.

Diode bar lasers have the unique advantage of focusing along one axis in a Cartesian coordinate system and are multimode, where elliptical and circular lasers focus along multiple axis. This means that a diode bar laser will focus along the short axis of the laser and not in the direction of the long axis. Aligning the long axis of a bar laser parallel to flow in a microfluidic device allows any cells or other objects 600 to be trapped along the short axis but to flow freely along the long axis. In the context of stretching, the cells will be stretched along a single axis but still flow downward through the microfluidic channel, thus allowing substantially higher throughput.

In accordance with at least one embodiment of the present invention, curing equipment may also be provided across the microfluidic channel to cure or tag objects 600 while they are being deformed by the optical trapping equipment 616. In one embodiment, the curing equipment may comprise a light source that applies UV light to the objects 600 while they are deformed by the optical trapping equipment 616. It may be possible to cure only a subset of the objects 600 that deformed in the microfluidic channel. For example, every fourth object 600 that passes through the microfluidic channel may be exposed to UV light while in a deformed state thereby tagging that particular cell for future identification. The curing equipment may be located in either the same plane as the optical trapping equipment 616 or the imaging optics 620. Alternatively, the curing equipment may be located in a completely different plane from either of these elements.

Figure 7:
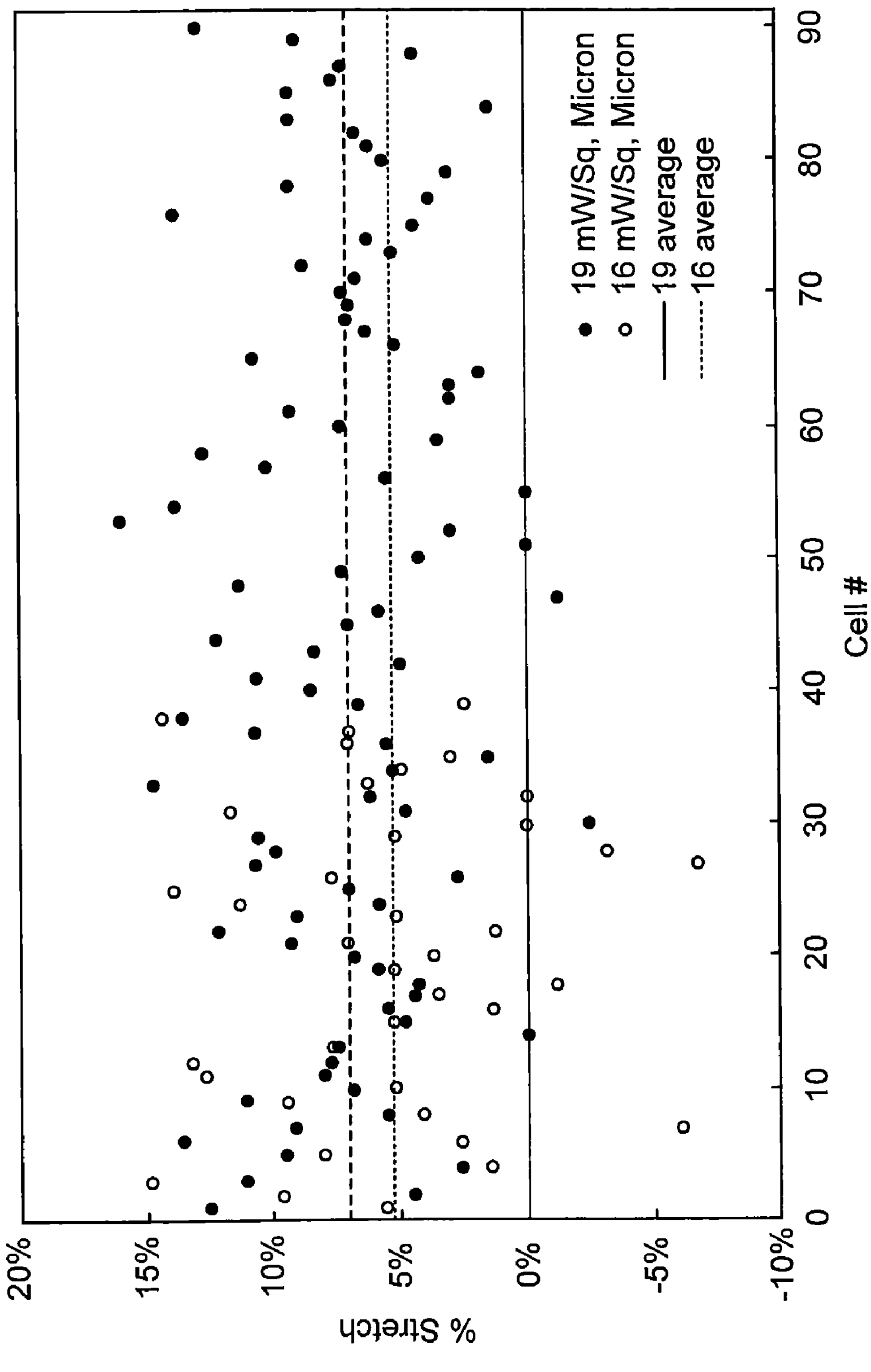
FIG. 7 is a first graph depicting stretching data for a number of cells flowed through and deformed in a microfluidic device in accordance with at least some embodiments of the present invention.

Referring now to FIG. 7, stretching data for a number of cells flowed through and deformed in a microfluidic device will be discussed in accordance with at least some embodiments of the present invention. As can be seen FIG. 7, experiments were run in-flow to demonstrate the potential of high throughput diode bar laser stretching. FIG. 7 shows the % stretch of 90 RBCs extracted from 4 mins of video stretched with a diode bar at an intensity of 19 mW/$\mu m^2$ and 39 RBCs stretched with a diode bar intensity of 16 mW/$\mu m^2$. The average % stretch was 7.0±2.8%, with a standard error of the mean of ±0.4% and 5.2±2.8% with a standard error of the mean of 0.8% at the 19 and 16 mW/$\mu m^2$ bar intensities, respectively. This % stretch is lower than the measured average percent stretch using the 830 nm elliptical diode laser; however, that is expected due to the lower intensity of the diode bar laser. The diode bar intensity in this experiment was half of that of the ellipse being run at a power of 85 mW. This lower intensity explains the slight drop in the measured stretch. The rate of sampling for this data was 1400 cells/hr, substantially higher then the reported maximum rate by prior art of 100 cells/hr.

Figure 8A:
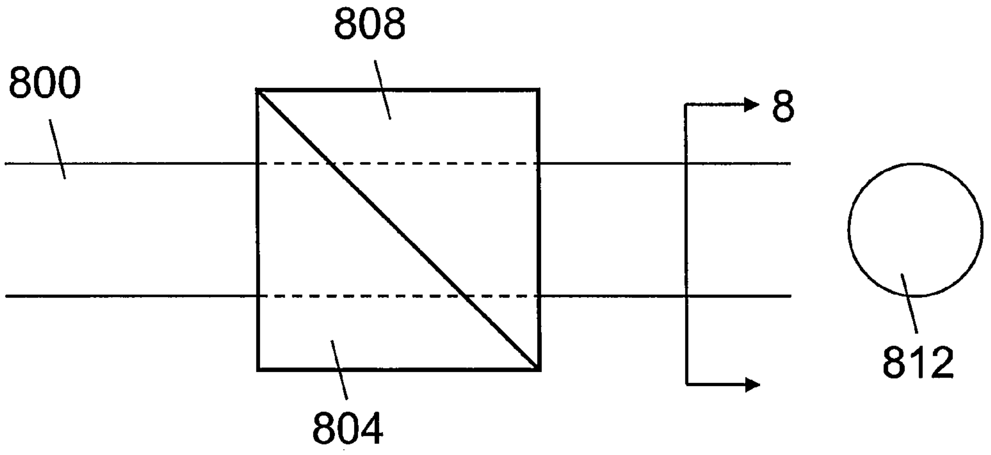
FIG. 8*a* is a block diagram depicting a first orientation of a single optical beam deformation setup utilizing a prism pair in accordance with at least some embodiments of the present invention.
Figure 8B:
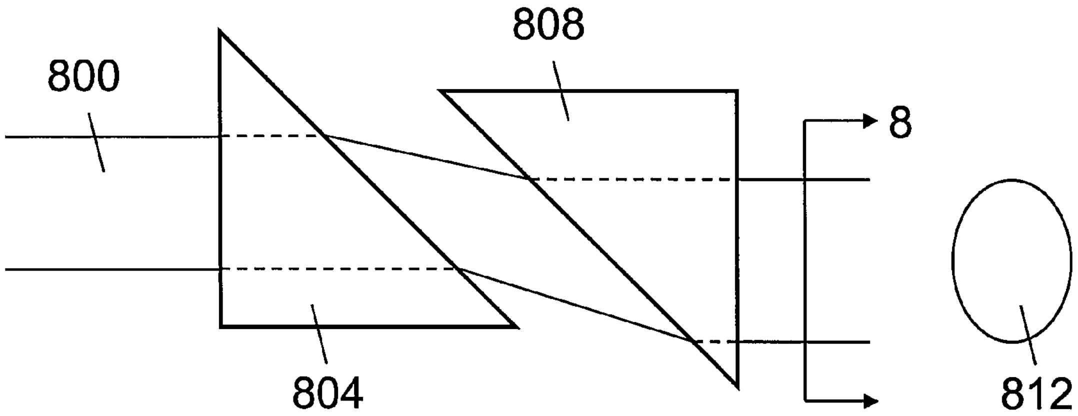
FIG. 8*b* is a block diagram depicting a second orientation of the single optical beam deformation setup utilizing a prism pair in accordance with at least some embodiments of the present invention.

With reference to FIGS. 8*a* and 8*b*, a static cell orientation and/or deformation setup will be described in accordance with at least some embodiments of the present invention. Although many advantages are provided by a high-throughput system as described above, the use of a single laser to orient and/or deform objects in a static orientation (i.e., where neither the laser source nor object being deformed are moved) is also possible. In one embodiment of the static orientation, a laser beam input 800 may be provided through a prism pair comprising a first prism 804 and a second prism 808. In a first prism pair orientation depicted in FIG. 8*a*, the input beam 800 passes through the prism pair without any substantial redirection or alteration. In other words, the prism pair has no optical effect on the laser beam in its first orientation. Thus, the cross-sectional profile of the beam 812 (as viewed from the perspective line 8) is substantially circular in nature.

When the prism pair is re-oriented, however, the cross-sectional profile of the beam 812 (as viewed from the perspective line 8) alters and becomes elliptical in nature. More specifically, the cross-sectional profile of the beam develops a major and minor axis as the first prism 804 is moved relative to the second prism 808. The alteration of the beam profile 812, and therefore the forces applied to a stationary cell or similar object within the beam 800, are changed as the cross-sectional profile of the beam 812 changes. This can all be accomplished without necessarily changing the location of the beam 800 input or the location of the object being re-oriented and/or deformed. The deformation of the beam 800 will depend upon the index of refraction of the prisms 804, 808 as well as the index of refraction of the medium through which the beam passes while not in the prisms 804, 808. Those skilled in the optical arts will appreciate that a number of different ways can be imagined to alter the orientation of the prism pair and therefore the cross-sectional profile of the beam 812 to orient and/or deform an object within the beam.

Figure 9:
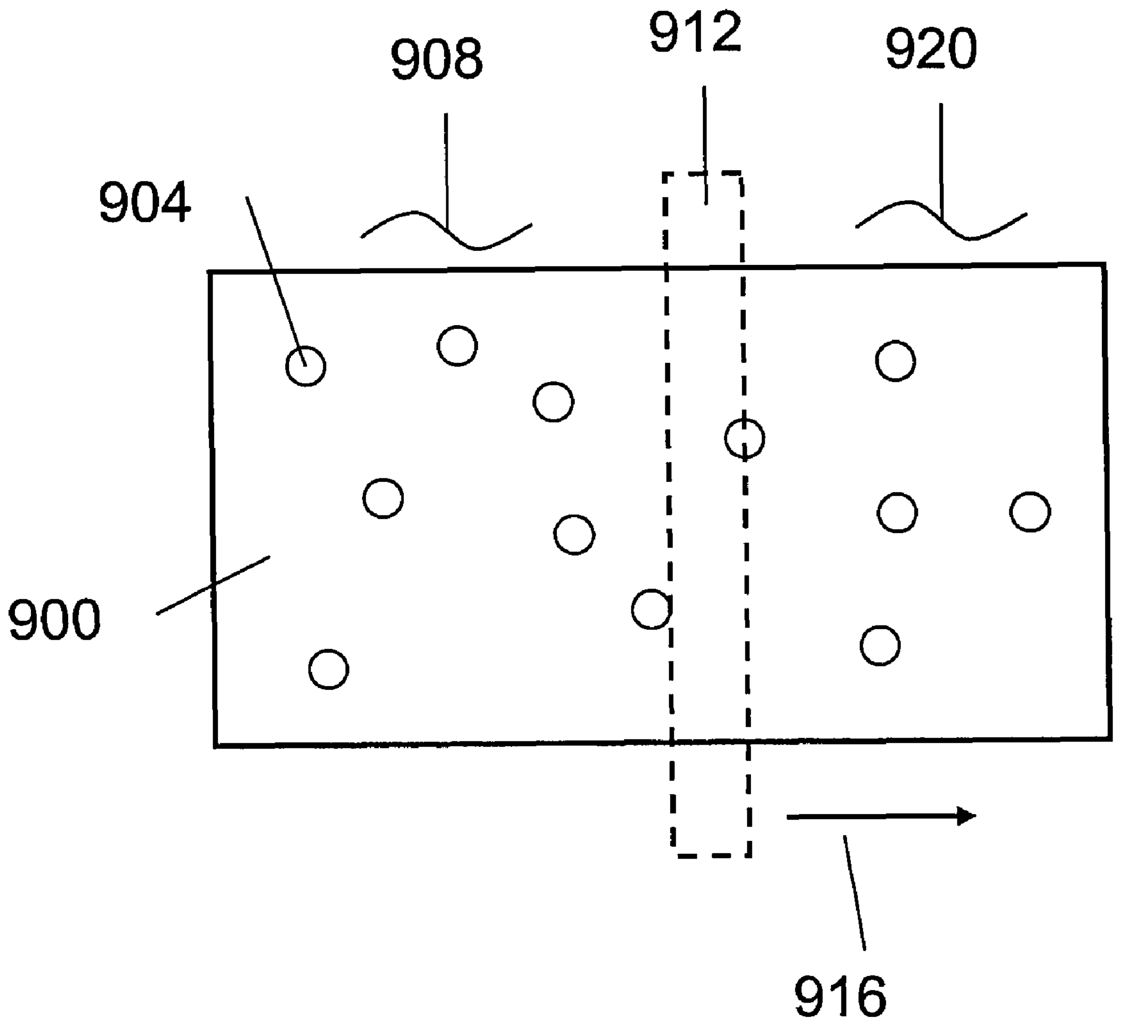
FIG. 9 is a block diagram depicting a cell orientation and/or deformation system where an optical source is scanned across a collection of cells in accordance with at least some embodiments of the present invention.

Referring now to FIG. 9, yet another cell orientation and/or deformation setup will be described in accordance with at least some embodiments of the present invention. The setup depicted in FIG. 9 corresponds to a scanning-type setup whereby a source of optical forces 912 is scanned across a sample or collection of deformable cells or objects 900. This is different from the high-throughput setup where objects are moved across a relatively stationary optical trapping source. In accordance with at least some embodiments of the present invention, the sample 900 may comprise multiple deformable objects 904. The deformable objects 904 may correspond to cells or the like that are in an aqueous solution. As the source of optical forces 912 (i.e., a laser beam or an optical field) is scanned across the sample in the direction of arrow 916, the deformable objects 904 may be re-oriented and/or deformed by the optical forces applied thereto.

In accordance with at least some embodiments of the present invention, the deformable objects 904 may also be cured when they are in a re-oriented and/or deformed state. This may be particularly useful in tissue engineering applications where it is desirable to have the collection of deformable objects 904 have the same or similar orientation in the sample 900. Thus, the first area of the sample 908 that has already been scanned and cured may have objects in a preferred orientation whereas the second area of the sample which has not been scanned 920 may have objects that are in their native or a non-preferred orientation.

Cells and other objects can, of course, be cured while in a deformed state in either the static setup (depicted and described in FIG. 8) or the scanning setup (depicted and described in FIG. 9). Thus, many different scenarios can be imagined where cells and/or other objects are deformed and cured for purposes of identifying and tagging such cells and/or other objects. The sources of optical forces used in either the static setup or scanning setup may be similar to the sources of optical forces used in the high-throughput setup. For example, a diode bar laser or fiber laser may be utilized to apply optical forces to the deformable objects in either setup. Similarly, the curing methods described in accordance with the high-throughput setup may also be utilized in the static and/or scanning setup. Other types of curing that may be performed include, but are not limited to, electromagnetic curing, chemical curing, and electrical curing.

In accordance with at least one embodiment of the present invention, alternative system setups can be utilized. For example, a high-throughput system can be envisioned that utilizes a 1 mm fiber to deliver the diode bar laser (e.g., an 810 nm diode bar laser) to the microfluidic plane. This fiber can be a mere 5 mm in length from the laser to the sample. Thus, the size of the trapping portion of the setup can be decreased considerably. This geometry has been shown to trap particles and cells and may also be used for cell stretching.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A method of changing the orientation of one or more objects, comprising:

providing one or more objects capable of being oriented by electromagnetic radiation;

illuminating the one or more objects with a single beam of electromagnetic radiation sufficient to change the orientation of the one or more objects from a first to a second orientation, wherein the one or more objects are deformed by the electromagnetic radiation; and curing the one or more objects while the one or more objects are in a deformed state corresponding to a preferred orientation.

2. The method of claim 1, wherein the one or more objects are stretched by the electromagnetic radiation.

3. The method of claim 2, further comprising measuring the deformation of the one or more objects while the one or more objects flow through the microfluidic channel.

4. The method of claim 3, wherein the deformation of the one or more objects is measured while the one or more objects are flowing in a hydrodynamically focused fluid flow in the microfluidic channel.

5. The method of claim 3, wherein a degree of deformation of the one or more objects is measured by at least one of optical microscopy detection, spectroscopic detection, electrophysiological detection, and scanning force microscopy detection.

6. The method of claim 2, wherein the deformation is achieved by altering at least one of a magnitude of the electromagnetic radiation illuminating the one or more objects and a cross-sectional profile of the electromagnetic radiation illuminating the one or more objects.

7. The method of claim 1, wherein the one or more objects are cured by at least one of electromagnetic curing, chemical curing, and electrical curing.

8. The method of claim 1, wherein a source of electromagnetic radiation comprises at least one of a gas laser, a chemical laser, an eximer laser, a solid-state laser, a fiber laser, a diode laser, and a dye laser.

9. The method of claim 1, wherein the one or more objects comprise a plurality of objects and wherein the electromagnetic radiation is scanned across the plurality of objects.

10. The method of claim 1, wherein the propagation direction of the electromagnetic radiation is substantially constant.

11. The method of claim 1, wherein the one or more objects comprise at least one of a cell, a bead, a colloid, and a particle.

12. The device of claim 1, wherein the electromagnetic radiation stretches the one or more objects.

13. The device of claim 12, further comprising a detector adapted to measure an amount of deformation of the one or more objects.

14. The device of claim 13, wherein the detector comprises at least one of an optical microscopy detector, a spectroscopic detector, an electrophysiological detector, and a scanning force microscopy detector.

15. The device of claim 12, wherein the deformation is achieved by altering at least one of a magnitude of the electromagnetic radiation illuminating the one or more objects and a cross-sectional profile of the electromagnetic radiation illuminating the one or more objects.

16. The device of claim 1, wherein the one or more objects are stretched while moving under laminar conditions through the microfluidic channel.

17. The device of claim 1, wherein a source of electromagnetic radiation comprises at least one of a gas laser, a chemical laser, an eximer laser, a solid-state laser, a fiber laser, a diode laser, and a dye laser.

18. The device of claim 1, wherein the one or more objects comprise at least one of a cell, a bead, a colloid, and a particle.

19. The device of claim 1, wherein the one or more objects comprise a plurality of objects and wherein the electromagnetic radiation is scanned across the plurality of objects.

20. The device of claim 1, wherein the propagation direction of the electromagnetic radiation is substantially constant.

21. A device for changing the orientation of objects, comprising:

a single beam source of electromagnetic radiation;

an optical element adapted to direct the electromagnetic radiation on one or more objects such that the electromagnetic radiation re-orients the one or more objects from a first orientation to a second orientation when illuminated with the electromagnetic radiation, wherein the electromagnetic radiation deforms the one or more objects; and a curing mechanism operable to cure the one or more objects while the one or more objects are in a deformed state.

22. The device of claim 21, wherein the curing mechanism comprises at least one of an electromagnetic curing mechanism, a chemical curing mechanism, and an electrical curing mechanism.

* * * * *